US012734799B2

(12) United States Patent
Kim et al.

(10) Patent No.: US 12,734,799 B2
(45) Date of Patent: Sep. 15, 2026

(54) SUBSTRATE TREATING CONTROL METHOD, SUBSTRATE TREATING APPARATUS, SUBSTRATE TREATING METHOD AND COMPUTER PROGRAM STORED IN COMPUTER READABLE MEDIUM FOR TREATING SUBSTRATE

(71) Applicant: SEMES CO., LTD., Cheonan-si (KR)

(72) Inventors: Sang Hoon Kim, Incheon (KR); Jae Hun Jeong, Cheonan-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 21 days.

(21) Appl. No.: 17/746,350

(22) Filed: May 17, 2022

(65) Prior Publication Data

US 2022/0371321 A1 Nov. 24, 2022

(30) Foreign Application Priority Data

May 18, 2021 (KR) ........................ 10-2021-0063981

(51) Int. Cl.
*B41J 2/045* (2006.01)

(52) U.S. Cl.
CPC ....... *B41J 2/04573* (2013.01); *B41J 2/04536* (2013.01); *B41J 2/04581* (2013.01)

(58) Field of Classification Search
None
See application file for complete search history.

(56) References Cited

U.S. PATENT DOCUMENTS

| | | | |
|---|---|---|---|
| 4,524,364 A | 6/1985 | Bain et al. | |
| 2010/0045731 A1 | 2/2010 | Kim | |
| 2018/0233667 A1* | 8/2018 | Wang | B41J 2/2139 |
| 2021/0162748 A1* | 6/2021 | Kida | B41J 2/04588 |
| 2022/0088952 A1* | 3/2022 | Sakurada | B41J 19/145 |

FOREIGN PATENT DOCUMENTS

| | | |
|---|---|---|
| CN | 108568383 A | 9/2018 |
| JP | 2003-053957 A | 2/2003 |
| JP | 2004-314361 A | 11/2004 |
| JP | 2008-221672 A | 9/2008 |
| JP | 2019-209672 A | 12/2019 |
| JP | 6760781 B2 | 9/2020 |
| KR | 100901075 B1 | 6/2009 |
| KR | 2011-0001445 A | 1/2011 |
| KR | 2011-0122386 A | 11/2011 |

(Continued)

OTHER PUBLICATIONS

Office Action dated Nov. 30, 2022 issued in related Korean patent application No. 10-2021-0063981.

(Continued)

*Primary Examiner* — Alejandro Valencia
(74) *Attorney, Agent, or Firm* — Harness, Dickey & Pierce, P.L.C.

(57) ABSTRACT

The inventive concept provides a substrate treating control method. The substrate treating control method includes discharging a droplet to a substrate in which a relative position to the head unit changes from a nozzle of a head unit, and wherein a correction value is applied at a discharge timing of the nozzle until a preset discharge cycle among a discharge cycle of the droplet discharged by the nozzle.

11 Claims, 10 Drawing Sheets

(56) References Cited

FOREIGN PATENT DOCUMENTS

| | | | |
|---|---|---|---|
| KR | 101095369 | B1 | 12/2011 |
| KR | 101178419 | B1 | 8/2012 |
| KR | 10-2018-0102500 | A | 9/2018 |

OTHER PUBLICATIONS

Office Action dated May 9, 2023, issued in corresponding Japanese Patent Application No. 2022-079926.

Y. Cho et al. "A Jet Strobe Signal Timing Control of Ink Jet Printer Head for Enhancement of Printing Speed and Quality" Journal of the Korea Institute of Information and Communication Engineering 15(8), 2011.08, 1727-1734 (8 pages).

Office Action for Chinese Application No. 202210547684.1 dated Apr. 14, 2023.

* cited by examiner

SUBSTRATE TREATING CONTROL METHOD, SUBSTRATE TREATING APPARATUS, SUBSTRATE TREATING METHOD AND COMPUTER PROGRAM STORED IN COMPUTER READABLE MEDIUM FOR TREATING SUBSTRATE

CROSS-REFERENCE TO RELATED APPLICATIONS

A claim for priority under 35 U.S.C. § 119 is made to Korean Patent Application No. 10-2021-0063981 filed on May 18, 2021, in the Korean Intellectual Property Office, the entire contents of which are hereby incorporated by reference.

BACKGROUND

Embodiments of the inventive concept described herein relate to a substrate treating control method, a substrate treating apparatus, a substrate treating method and a computer program stored in a computer readable medium for treating a substrate.

Recently, there has been a need to manufacture display devices such as a liquid crystal display device and an organic EL display device having a high resolution. In order to manufacture a display device having a high resolution, more pixels per unit area should be formed on a substrate such as a glass, and it is important to discharge an ink droplet to an accurate position in an accurate amount at each of the densely arranged pixels. An impact position correction of matching an impact position of an ink droplet discharged from an inkjet head with a desired position is essential.

Conventionally, in order to correct the impact position of the ink droplet, the ink droplet is discharged onto a substrate on which a mark is displayed, and an amount of a deviation between the mark and the ink droplet is detected. Also, a relative position of a droplet discharge head is corrected by using the detected amount of the deviation, or a droplet discharge timing is corrected. Such a correction method generally focuses on correcting a deviation amount caused by factors such as a degree of a mechanical precision of the substrate treating apparatus and a temperature change of the droplet.

Meanwhile, the ink droplet is discharged by the inkjet head repeatedly, at a plurality of times, onto a substrate moving in a direction and at a constant speed. When a substrate moving at a speed enters an area below the inkjet head, a transverse airflow is generated between the substrate and the inkjet head. Such a transverse airflow affects an impact position of a droplet discharged onto the substrate. In addition, in order to manufacture a display device having a high resolution, it is required to discharge a droplet of a small size onto the substrate. However, as the size of the droplet decreases, a change rate of the impact position increases due to a greater influence of the transverse airflow described above.

SUMMARY

Embodiments of the inventive concept provide a substrate treating control method, a substrate treating apparatus, a substrate treating method and a computer program stored in a computer readable medium capable of effectively treating a substrate.

Embodiments of the inventive concept provide a substrate treating control method, a substrate treating apparatus, a substrate treating method and a computer program stored in a computer readable medium capable of appropriately discharging an ink droplet in a desired position.

Embodiments of the inventive concept provide a substrate treating control method, a substrate treating apparatus, a substrate treating method and a computer program stored in a computer readable medium capable of improving a uniformity between ink droplets discharged onto a substrate.

Embodiments of the inventive concept provide a substrate treating control method, a substrate treating apparatus, a substrate treating method and a computer program stored in a computer readable medium capable of minimizing a weakening of a uniformity between ink droplets discharged onto a substrate, caused by a change in a falling position of an ink droplet due to a transverse airflow generated between the substrate and the head.

The technical objectives of the inventive concept are not limited to the above-mentioned ones, and the other unmentioned technical objects will become apparent to those skilled in the art from the following description.

The inventive concept provides a substrate treating control method. The substrate treating control method includes discharging a droplet to a substrate in which a relative position to the head unit changes from a nozzle of a head unit, and wherein a correction value is applied at a discharge timing of the nozzle until a preset discharge cycle among a discharge cycle of the droplet discharged by the nozzle.

In an embodiment, the substrate treating control method further includes a step for predicting a convergence discharge cycle of when a falling position variance of the droplet discharged from the nozzle is constant, based on a reference data previously collected at a treating condition set to treat the substrate; and a step for deciding on a discharge cycle before the convergence discharge cycle as the preset discharge cycle.

In an embodiment, the reference data includes an information collected at each discharge cycle of the droplet of the falling position variance of the droplet discharged in at least a number in a plurality at a same interval by the head unit to a substrate moving in a speed.

In an embodiment, the reference data includes an information of the falling position variance according to at least one experimental condition among a transfer speed of a substrate, a falling distance of a droplet, a falling speed of a droplet, an amount of a droplet, and a weight of a droplet.

In an embodiment, a prediction of the convergence discharge cycle reduces as the transfer speed of the substrate set as the treating condition increases.

In an embodiment, the prediction of the convergence discharge cycle increases as the falling distance of the droplet set as the treating condition increases.

In an embodiment, the correction value is a correction value delaying the discharge timing of the preset discharge cycle.

In an embodiment, when the preset discharge cycle exists in a number in a plurality, the correction value is applied higher as a discharge cycle is further from the convergence discharge cycle.

In an embodiment, the correction value is applied lower as the falling speed of the droplet set as the treating condition increases.

In an embodiment, the correction value is applied lower as the weight of the droplet set as the treating condition increases.

In an embodiment, the correction value is applied lower as the amount of the droplet set as the treating condition increases.

In an embodiment, the correction value is applied higher as the transfer speed of the substrate set as the treating condition increases.

In an embodiment, the correction value is applied higher as the falling distance of the droplet set as the treating condition increases.

The inventive concept provides a substrate treating apparatus. The substrate treating apparatus includes a transfer unit configured to transfer a substrate; a head unit configured to discharge an ink in a droplet to the substrate being transferred by the transfer unit at a speed; and a controller configured to control the transfer unit and the head unit, and wherein the head unit comprises: a head having at least one nozzle formed thereon; and a discharge member disposed within the head and configured to embody a discharge motion of the droplet, and wherein the controller comprises: a data storage unit configured to store a reference data which is previously acquired; a condition reception unit configured to receive a treating condition for treating the substrate; a prediction unit configured to predict a convergence discharge cycle, at which a falling position variance of the droplet discharged from the nozzle becomes constant, based on the reference data and the treating condition; and a correction unit for calculating a correction value of a droplet discharge timing of an initial discharge cycle performed before the convergence discharge cycle predicted by the prediction unit.

In an embodiment, the prediction unit predicts the convergence discharge cycle to decrease as the speed of the substrate set as the treating condition increases, and as a falling distance of the droplet set as the treating condition decreases.

In an embodiment, the correction unit calculates the correction value delaying a discharge timing of the droplet discharged at the initial discharge cycle.

In an embodiment, the correction unit calculates the correction value to delay the liquid discharge timing to be later as the initial discharge cycle is further from the convergence discharge cycle, when the initial discharge cycle exists in a number in a plurality.

In an embodiment, the correction unit calculates the correction value of the droplet discharge timing to be lower as a pressure of the discharge member set as the treating condition is higher, as a weight of the droplet set as the treating condition is higher, and as an amount of the droplet set as the treating condition is higher, and calculates the correction value to be higher as the speed of the substrate set as the treating condition is higher, and as a falling speed of the droplet set as the treating condition is higher.

The inventive concept provides a substrate treating method. The substrate treating method includes discharging a droplet in a number in a plurality to the substrate moving at a speed from a head unit, and wherein a discharge timing of the droplet of the head unit at a first discharge cycle among the discharge cycles of the droplet is different from a discharge timing of the droplet of the head unit at a second discharge cycle which is later than the first discharge cycle.

In an embodiment, the discharge timing of the droplet of the head unit at the first discharge cycle is later than the discharge timing of the droplet of the head unit at the second discharge cycle.

The inventive concept provides a computer program stored in a computer readable medium for treating a substrate, the computer program stored in a computer readable medium for treating a substrate capable of executing at least one processor, and including commands for commanding a performing of an action below with the at least one processor, and wherein the action comprises: an action of receiving a reference data which is previously acquired; an action of receiving a treating condition for treating the substrate; an action of predicting a convergence discharge cycle, in which a falling position variance of an ink droplet becomes constant when the head unit discharges the ink droplet in a number in a plurality to a substrate moving in a direction, based on the reference data and the treating condition; an action of calculating a correction value of a droplet discharge timing of the head unit of an initial discharge cycle which is performed before the convergence discharge cycle; and an action of controlling the head unit based on the correction value, and wherein the reference data includes an information of the falling position variance according to at least one set condition among a transfer speed of the substrate, a falling distance of the droplet, a falling speed of the droplet, an amount of the droplet, and a weight of the droplet, and wherein the action of predicting the convergence discharge cycle predicts the convergence discharge cycle to decrease as the transfer speed of the substrate set as the treating condition increases, and as a distance between the substrate and the head set as the treating condition decreases, and wherein the action of calculating the correction value calculates the correction value to delay the droplet discharge timing of the droplet discharged at the initial discharge cycle, and calculates the correction value to be lower as the falling speed of the ink drop set as the treating condition increases, the amount of the ink droplet set as the treating condition increases, the weight of the ink droplet set as the treating condition increases, the transfer speed of the substrate set as the treating condition decreases, and as the distance between the substrate and the head decreases.

In an embodiment, the above action is performed when a volume of an ink droplet discharged from the head unit is 6.7 pl or less.

According to an embodiment of the inventive concept, a substrate may be efficiently treated.

According to an embodiment of the inventive concept, an ink liquid drop may be appropriately discharged at a desired position.

According to an embodiment of the inventive concept, a uniformity between ink droplets discharged onto a substrate may be improved.

According to an embodiment of the inventive concept, a weakening of a uniformity between ink droplets discharged onto a substrate caused by a change in a falling position of an ink droplet due to a transverse airflow generated between the substrate and the head may be minimized.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
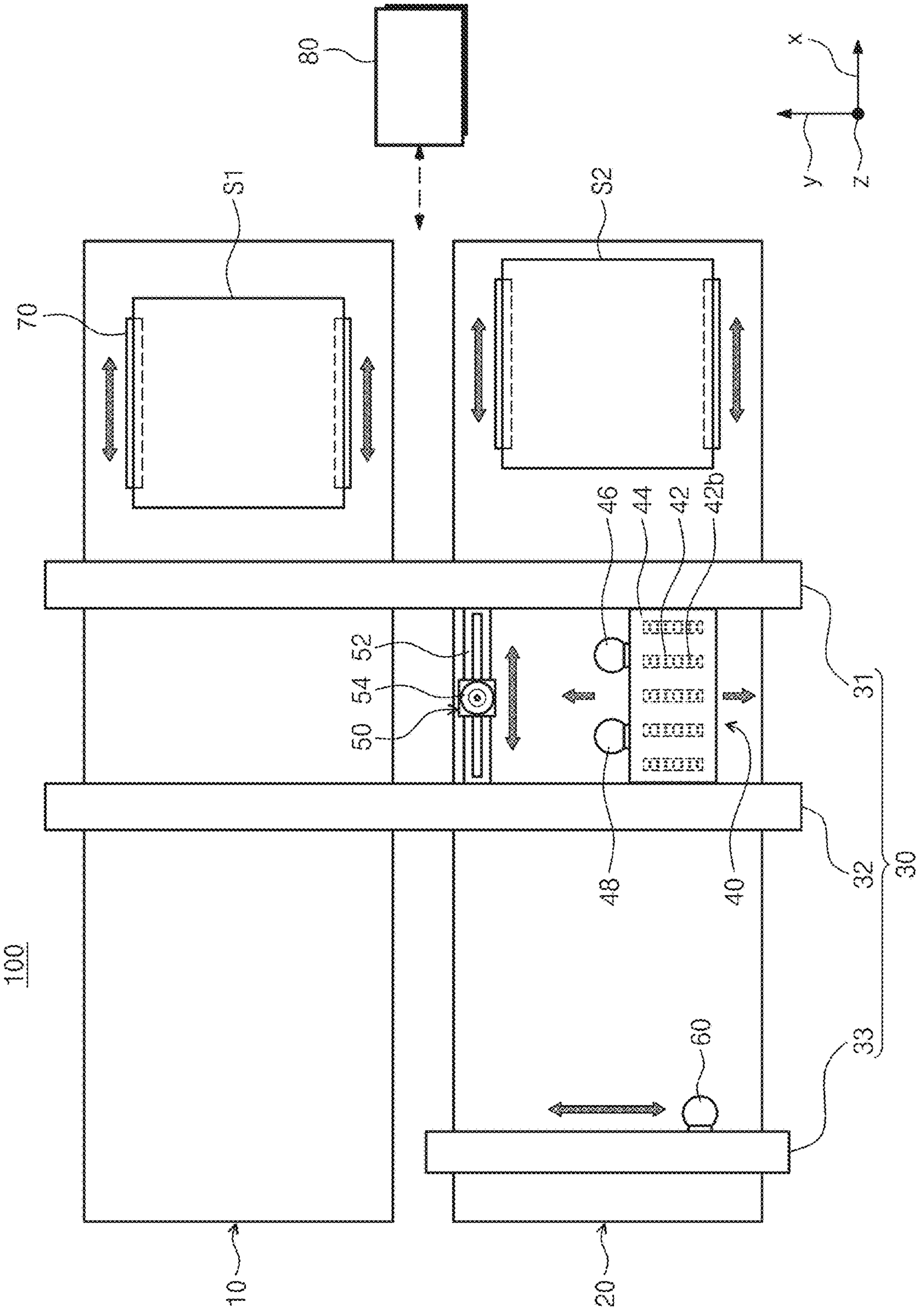
FIG. 1 illustrates a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being "connected to" or "coupled to" another element or layer, it may be connected to, coupled to, or covering the other element or layer or intervening elements or layers may be present. In contrast, when an element is referred to as being "directly connected to," or "directly coupled to" another element or layer, there are no intervening elements or layers present. Other terms such as "between", "adjacent", "near" or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Hereinafter, an embodiment of the inventive concept will be described with reference to FIG. 1 to FIG. 14.

FIG. 1 illustrates a substrate treating apparatus according to an embodiment of the inventive concept. Referring to FIG. 1, the substrate treating apparatus 100 according to an embodiment of the inventive concept may be an inkjet apparatus that treats a substrate by supplying a treating liquid such as an ink onto the substrate S. The substrate S may include a first substrate S1, which is to be treated, and a second substrate S2, which is a dummy substrate used to correct a position, a timing, and the like, of an ink droplet discharged onto the first substrate S1. In addition, the substrate S may be a glass. The substrate treating apparatus 100 may perform a printing process on the substrate S by discharging the ink droplet onto the substrate S.

The substrate treating apparatus 100 may include a printing unit 10, a maintenance unit 20, a gantry 30, a head unit 40, a nozzle alignment unit 50, a fourth vision unit 60, a transfer unit 70, and a controller 80.

When viewed from above, the printing unit 10 may be provided with its lengthwise direction in a first direction X. Hereinafter, when viewed from above, a direction perpendicular to the first direction X is referred to as a second direction Y, and a direction perpendicular to the first direction X and the second direction Y is referred to as a third direction Z. The third direction Z may be a direction perpendicular to the ground. In addition, the first direction X may be a direction in which a first substrate S1 to be described later is transferred by the transfer unit 70. In the printing unit 10, a printing process on the first substrate S1 may be performed by discharging an ink from the head unit 40 to be described later to the first substrate S1.

In addition, the first substrate S1 transferred from the printing unit 10 may be maintained in a floating state. Accordingly, the printing unit 10 may be provided with a floating stage capable of floating the first substrate S1 when transferring the first substrate S1. The floating stage may supply an air to a bottom surface of the first substrate S1 to allow the first substrate S1 to float.

The transfer unit 70 may grip one or both sides of the first substrate S1 in the printing unit 10 to move the first substrate S1 along the first direction X. The transfer unit 70 may grip a bottom surface of an edge region of the first substrate S1 in a vacuum suction method. The transfer unit 70 may move along a guide rail provided in the lengthwise direction of the printing unit 10. That is, the transfer unit 70 may include a guide rail provided along one side or both sides of the floating stage, and a gripper gliding along the guide rail while holding one side or both sides of the first substrate S1.

In addition, the maintenance unit 20 is also provided with a transfer unit having the same structure and/or similar function as the transfer unit 70 provided to the printing unit 10, and so the maintenance unit 20 may move the second substrate S2 in the first direction X.

A maintenance of the head unit 40 to be described later may be mainly performed at the maintenance unit 20. For example, the maintenance unit 20 may check a state of the head unit 40 or may perform a cleaning of the head unit 40. When viewed from above, the maintenance unit 20 may be provided with its lengthwise direction in the first direction X. In addition, the maintenance unit 20 may be disposed side by side with the printing unit 10. For example, the maintenance unit 20 and the printing unit 10 may be arranged in parallel in the second direction Y.

In addition, in the case of the maintenance unit 20, since ink droplets may be discharged for an impact position correction, a volume adjustment, and a discharge volume control, etc of ink droplets discharged by the head unit 40 to be described later, the maintenance unit 20 may have the same or a similar process environment as the printing unit 10.

The gantry 30 may be provided such that the head unit 40 to be described later or a fourth vision unit 60 to be described later may go back and forth in a straight line. The gantry 30 may include a first gantry 31, a second gantry 32, and a third gantry 33. The first gantry 31 and the second gantry 32 may be provided to have a structure extending along the printing unit 10 and the maintenance unit 20. In addition, the first gantry 31 and the second gantry 32 may be disposed to be spaced apart from each other in the first direction X. That is, the first gantry 31 and the second gantry 32 may be provided to have a structure extending in the second direction Y in which the printing unit 10 and the maintenance unit 20 are disposed so that the head unit 40 to be described later may move in the second direction Y.

In addition, the third gantry 33 may be provided to have a structure in which the printing unit 10 extends along the second direction Y. That is, the third gantry 33 may be provided to have a structure in which the fourth vision unit 60 extends to move along the second direction Y. The fourth vision unit 60 may go back and forth along the third gantry 33 to obtain an image capable of confirming an impact position of an ink droplet discharged from the maintenance unit 20 and a volume of the ink droplet. For example, the head unit 40 may discharge an ink droplet to a calibration board, for example, the second substrate S2, which may be provided to the maintenance unit 20. The second substrate S2 may be moved to a bottom region of the fourth vision unit 60, and the fourth vision unit 60 may obtain an image of the second substrate S2 from which the ink droplet is discharged. The image acquired by the fourth vision unit 60 may be transmitted to the controller 80. The fourth vision unit 60 may be a camera including an image acquisition module.

Figure 2:
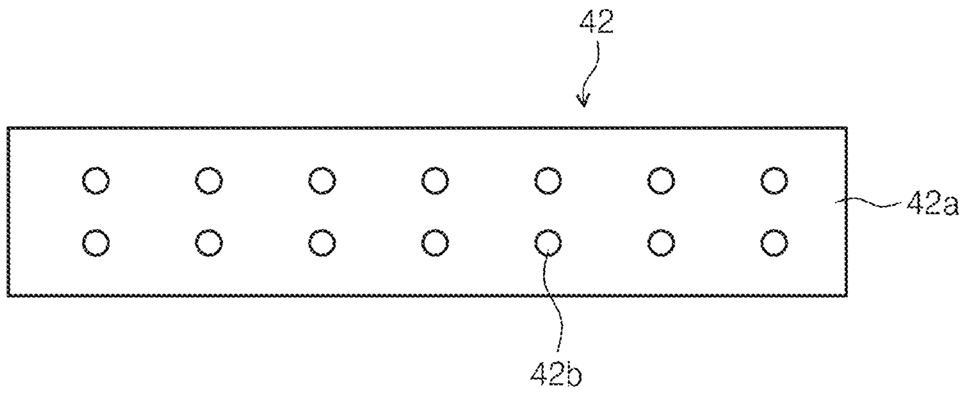
FIG. 2 illustrates a nozzle plate of a head of FIG. 1.
Figure 3:
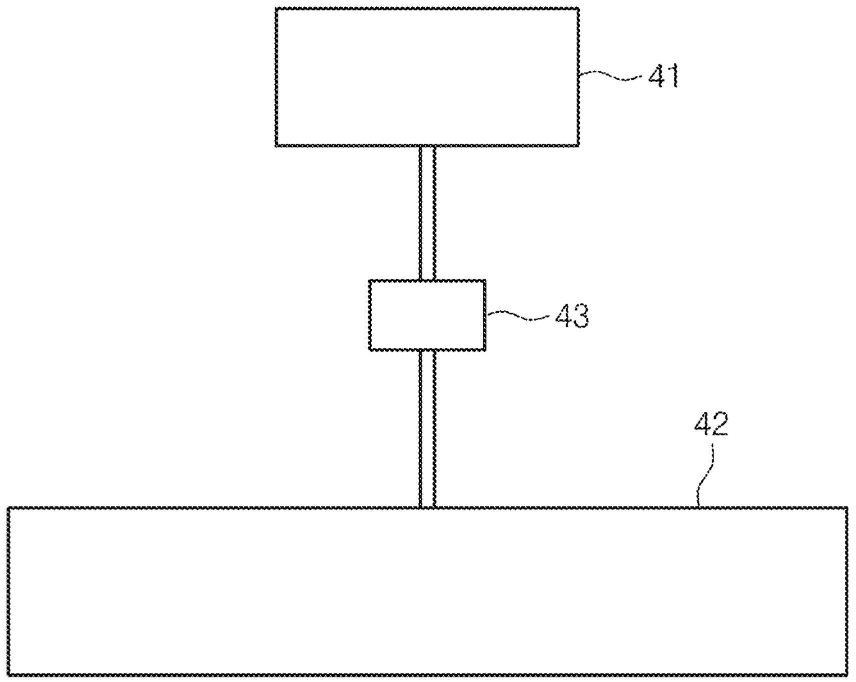
FIG. 3 schematically illustrates an ink storage member, a discharge member, and a head of a heat unit FIG. 1

FIG. 2 illustrates a state of a nozzle plate of the head of FIG. 1, and FIG. 3 schematically illustrates an ink storage member, a discharge member, and a head of the head unit of FIG. 1.

Referring to FIG. 1 to FIG. 3, the head unit 40 may discharge an ink droplet to the substrate S. The head unit may perform a printing process on the substrate S by discharging the ink droplet to the substrate S. For example, the head unit 40 may perform a printing process on the substrate S by discharging the ink droplet on the substrate S while going back and forth along the second direction Y.

The head unit 40 may include an ink storage member 41, a head 42, a discharge member 43, a head frame 44, a first vision unit 46, and a second vision unit 48. The head unit 40 may discharge the ink in a form of a droplet to the substrate S being moved by the above-descripted transfer unit 70 at a speed.

The ink storage member 41 may store an ink that head unit 40 discharges to the substrate S. The ink storage member 41 may be referred to as a reservoir. The ink storage member 41 may include a flow device (not shown) capable of preventing a solidification of the ink discharged to the substrate S. The flow device (not shown) may prevent a solidification of the ink by flowing the ink stored within the ink storage member 41.

The head 42 may be provided in a plurality. The plurality of heads 42 may be arranged side by side along the first direction X. The plurality of heads 42 may be fitted to the head frame 44. In addition, the head 42 may include a nozzle plate 41*a* in which at least one nozzle 42*b* is formed. The ink droplet may be discharged from the nozzle 42*b*.

The discharge member 43 may be provided between the ink storage member 41 and the head 42. For example, the discharge member 43 may be provided on a supply pipe for supplying the ink from the ink storage member 41 to the head 42. The discharge member 43 may be a piezoelectric element. For example, the discharge member 43 may be a piezoelectric element. The discharge member 43 may receive a droplet discharge signal from the controller 80 to implement a liquid discharge operation of the head unit 40.

In FIG. 3, the discharge member 43 is installed at the supply pipe between the head 42 and the ink storage member 41 as an example, but this invention is not limited to it. For example, the discharge member 43 may be provided at the head 42 or the head frame 44. An ink transfer from the ink storage member 41 to the head 42 may be performed by a pressure of an inert gas such as a nitrogen, and the discharge member 43 provided within the head 42 or the head frame 44 may implement a liquid discharge operation of the head unit 40 based on an electrical signal from the controller 80.

The first vision unit 46 and the second vision unit 48 may be installed at the head frame 44. In addition, when seen from above, the first vision portion 46 and the second vision portion 48 may be coupled to a side of the head 42. The first vision unit 46 and the second vision unit 48 may obtain an image capable of identifying the impact position of the ink droplet discharged from the head unit 40 to the substrate S and a volume of the ink droplet. For example, when the head unit 40 discharges the ink droplet to the substrate S provided at the printing unit 10, the first vision unit 46 and the second vision unit 48 may photograph the substrate S, and the captured image may be transmitted to the controller 80. The user may check the impact position of the ink droplet discharged to the substrate S or the volume of the ink droplet through the image captured by the first vision unit 46 and the second vision unit 48 transferred to the controller 80. The first vision unit 46 and the second vision unit 48 may be arranged side by side in the first direction X. The first vision unit 46 and the second vision unit 48 may be cameras capable of identifying the ink droplets discharged by the head 42.

The head 42 may be movably coupled to the first gantry 31 and the second gantry 32 via the head frame 44. For example, the head 42 may be provided to be movable along the second direction Y, which is the lengthwise direction of the first gantry 31 and the second gantry 32. In addition, the head 42 may go back and forth between the printing unit 10 and the maintenance unit 20 along the second direction Y, which is the lengthwise direction of the first gantry 31 and the second gantry 32.

Referring to FIG. 1, the nozzle alignment unit 50 may be provided to the maintenance unit 20. The nozzle alignment unit 50 may be provided between the first gantry 31 and the second gantry 32 when viewed from above. Accordingly, the nozzle alignment unit 50 may check a states of the nozzles 42*b* formed at the head 42. For example, the nozzle alignment unit 50 may include a moving rail 52 and the third vision unit 54. A lengthwise direction of the moving rail 52 may be the first direction X. The third vision unit 54 may go back and forth along the first direction X, which is the lengthwise direction of the moving rail 52. The third vision unit 54 may photograph the nozzles 42*b* of the head 42 while moving along the lengthwise direction of the moving rail 52.

The controller 80 may control the substrate treating apparatus 100. The controller 80 may control the substrate treating apparatus 100 so that the substrate treating apparatus 100 may perform the printing process on the substrate S. In addition, the controller 80 may control the head unit 40 so that the head unit 40 of the substrate treating apparatus 100 may discharge the ink droplet to the substrate S to perform the printing process on the substrate S, for example, the first substrate S1. In addition, the controller 80 may control the substrate treating apparatus 100 so that the substrate treating apparatus 100 may perform a maintenance on the head unit 40.

The controller 80 may also be configured as a computer program stored in a computer-readable medium, including at least one processor that executes a controlling of the substrate treating apparatus 100, including instructions for such a processor to perform operations for controlling the substrate treating apparatus 100. In addition, the controller 80 may include a user interface formed of a keyboard in which an operator performs a command input operation to manage the substrate treating apparatus 100, a display for visualizing and displaying an operating state of the substrate treating apparatus 100, and the like. In addition, the user interface and a storage unit may be connected to the processor.

Figure 4:
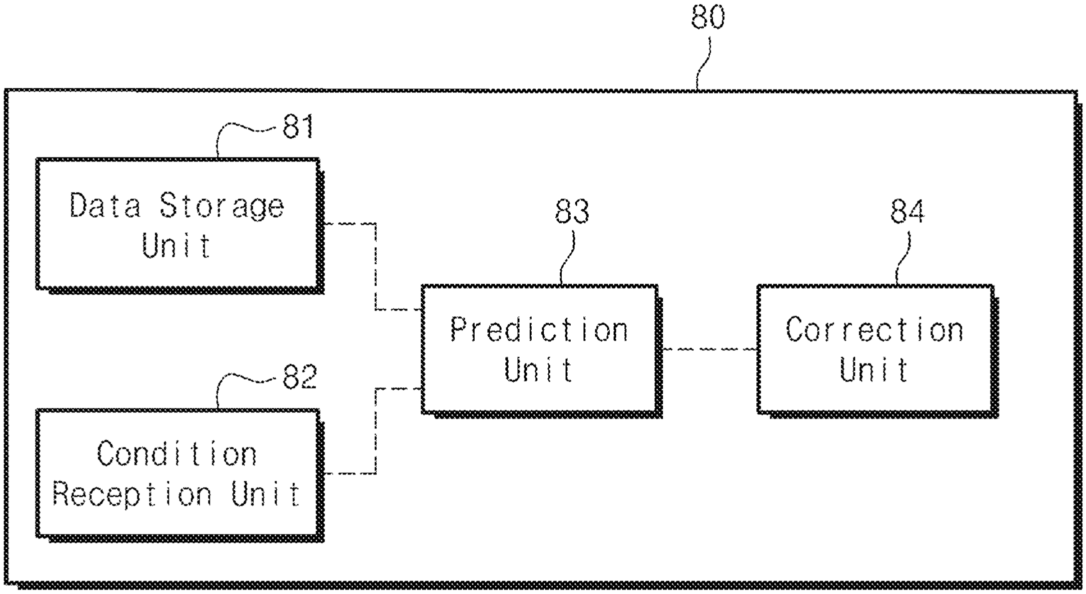
FIG. 4 illustrates a functional configuration of a controller of FIG. 1.

FIG. 4 illustrates a functional configuration of the controller of FIG. 1. Referring to FIG. 4, the controller 80 may include a data storage unit 81, a condition reception unit 82, a prediction unit 83, and a correction unit 84.

The data storage unit 81 may store a reference data acquired in a step S01 of obtaining a reference data to be described later. The data storage unit 81 may store a previously acquired reference data. The data storage unit 81 may be provided as at least one storage medium among a flash memory, a hard disk, a card type memory, a RAM, a SRAM, a ROM, a EEPROM, a PROM, a magnetic memory, a magnetic disk, and an optical disk.

The condition reception unit 82 may receive a treating condition for treating the substrate S. The treating condition for treating the substrate S may include a distance between the head 42 and the substrate S (a falling distance of the ink droplet), a transfer speed of the substrate S (a relative speed of the head 42 and the substrate S), a discharge speed of the ink droplet (a pressure generated by the discharge member 43), a weight of the ink droplet (a weight per type of an ink or per unit volume of the ink droplet), an amount of the ink droplet (a volume of the ink droplet) and the like. The condition reception unit 82 may receive the treating conditions input (set) by the operator (user).

The prediction unit 83 may predict the convergence discharge cycle in which the falling position variance of the droplet is constant when the head unit 40 discharges the ink droplets in a plurality based on the reference data stored at the data storage unit 81 and the treating condition received by the condition reception unit 82. For example, the prediction unit 83 may perform a step of predicting a convergence discharge cycle S02 to be described later.

The correction unit 84 may calculate the correction value applied to the ink droplet discharge timing of the head unit 40 until a preset discharge cycle. For example, the correction unit 84 may perform a step of calculating the correction value of the droplet discharge timing S03 and a step for controlling the head unit 40 based on the correction value S04 for the initial discharge cycle performed before the convergence discharge cycle predicted by the prediction unit 83 to be described later.

A detailed description of a step of obtaining the reference data S01, a step of predicting the convergence discharge cycle S02, a step of calculating the correction value of the droplet discharge timing S03, and a step of controlling the head unit 40 based on the correction value S04 will be described later.

Figure 5:
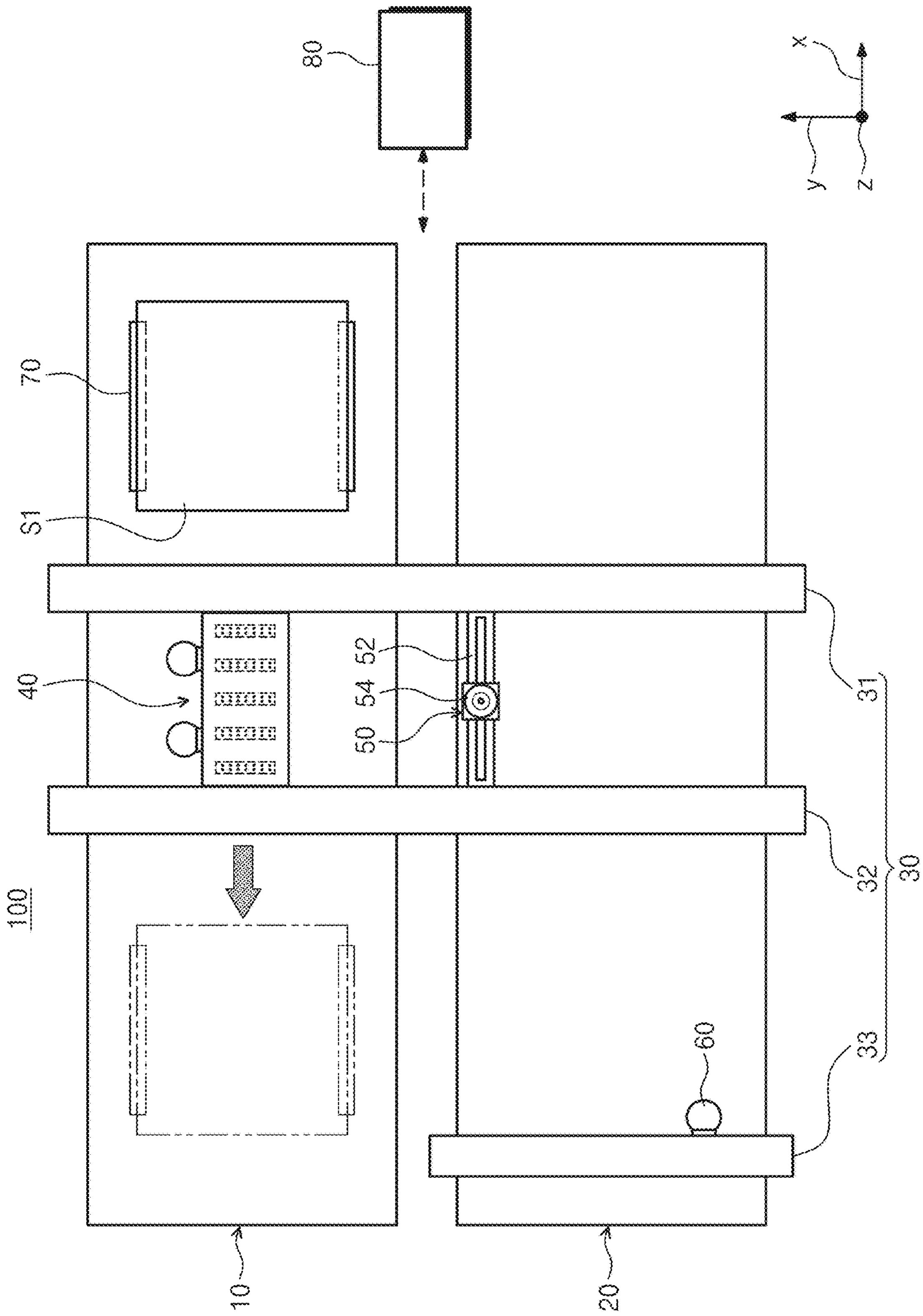
FIG. 5, FIG. 6, and FIG. 7 illustrate a method of discharging a droplet on a substrate by the substrate treating apparatus of FIG. 1
Figure 6:
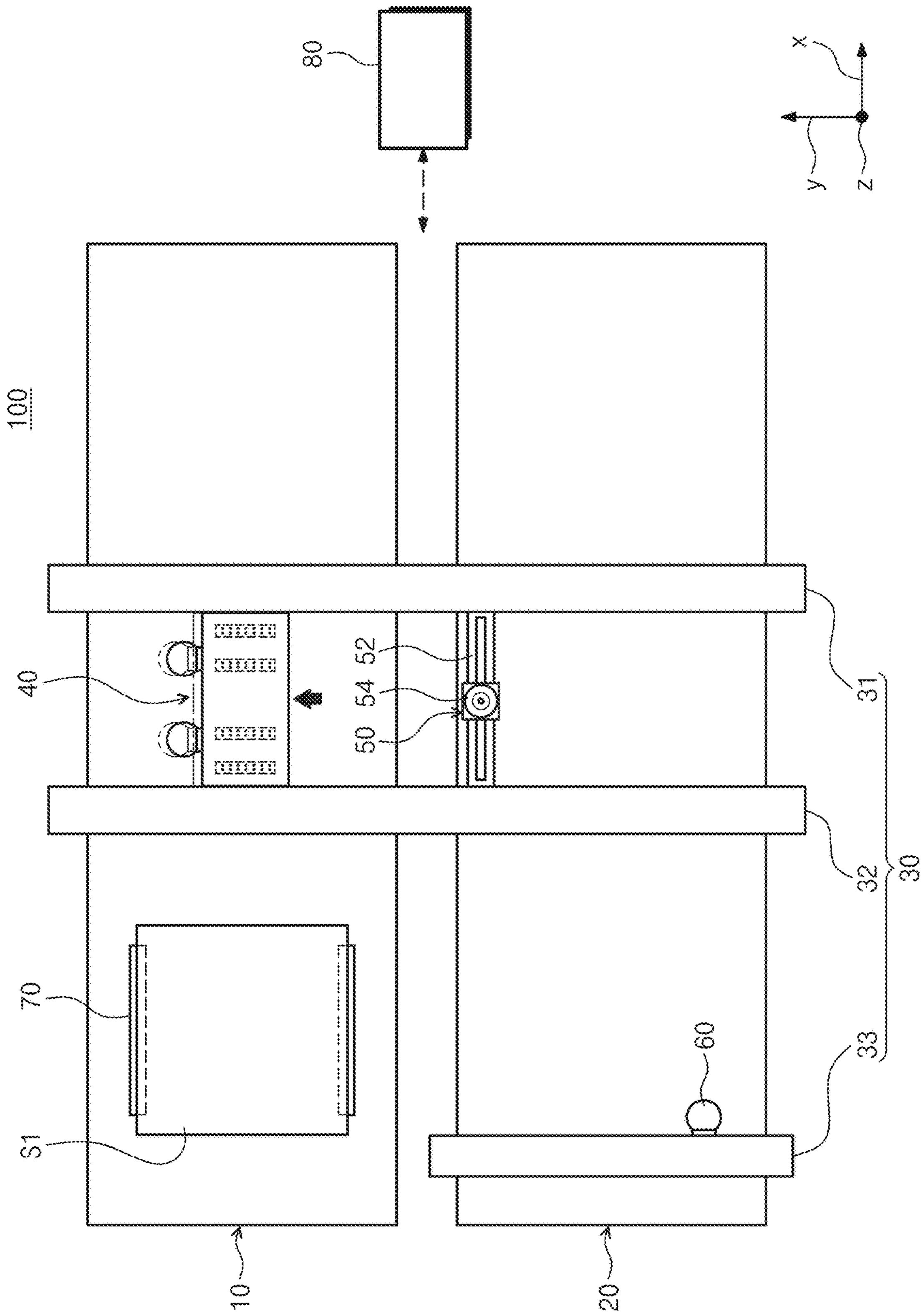
Figure 7:
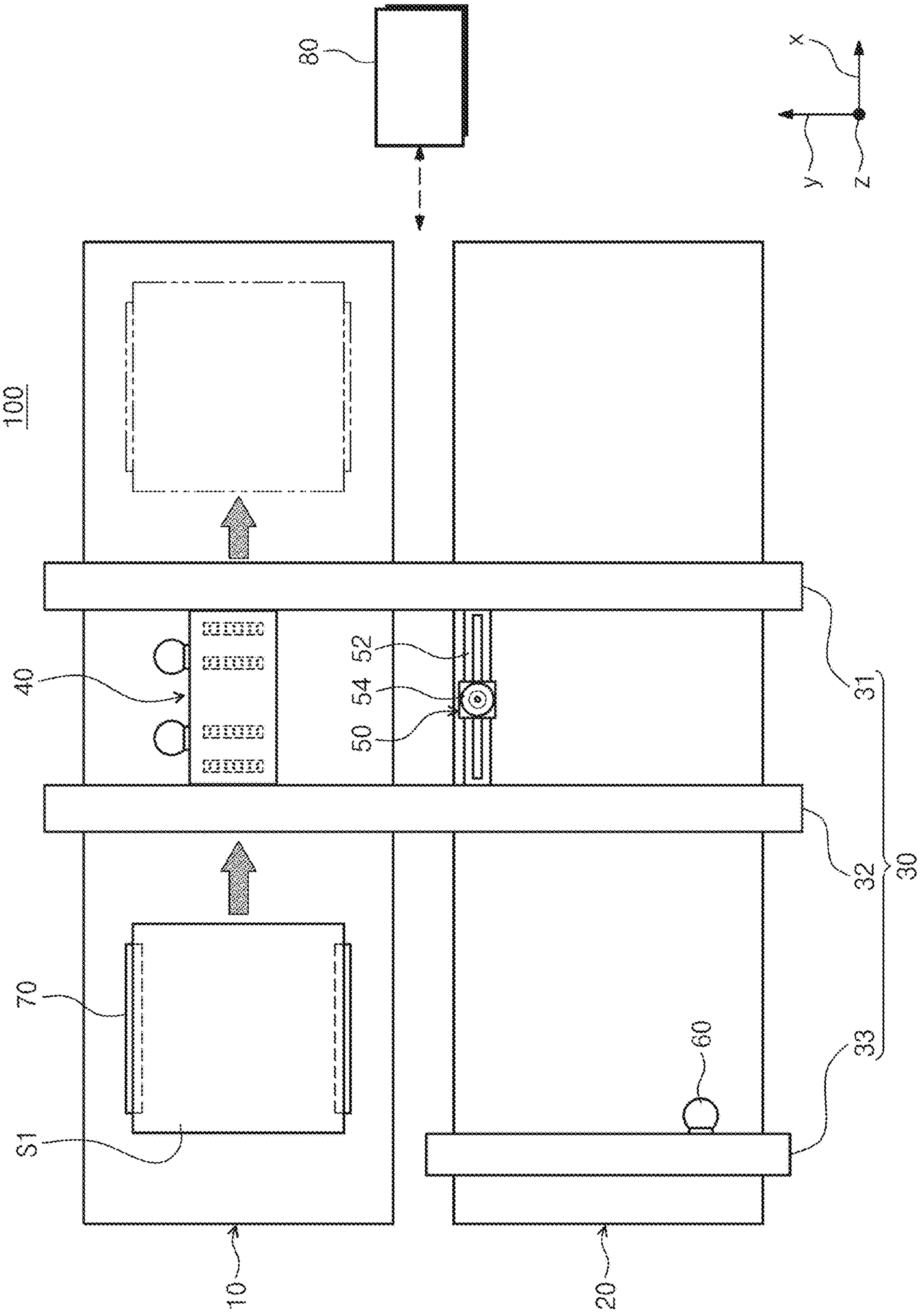

FIG. 5, FIG. 6, and FIG. 7 illustrate a method in which the substrate treating apparatus of FIG. 1 discharges an ink droplet to the substrate. Referring to FIG. 5 to FIG. 7, the head unit 40 discharges the ink droplet to the first substrate S1 moving at a constant speed and performs the printing process on the first substrate S1.

As shown in FIG. 5, the first substrate S1 may be moved along the first direction X at a constant speed by the transfer unit 70. In this case, a position of the head unit 40 may be fixed. When the first substrate S1 enters a region below the head unit 40 by the transfer unit 70, the controller 80 may generate a droplet discharge signal so that the head unit 40 may discharge the ink droplet to the first substrate S1. The droplet discharge signal may be transmitted to the discharge member 43 of the head unit 40. When the discharge member 43 receives the droplet discharge signal, the head unit 40 may discharge the ink droplet to a top surface of the first substrate S1. In addition, the droplet discharge signal may be repeatedly transmitted a plurality of times within a same time interval to the discharge member 43.

As illustrated in FIG. 6, when the first substrate S1 passes through a bottom below the head unit 40, the position of the head unit 40 may be changed along the second direction Y. For example, the controller 80 may generate a position change signal for changing the position of the head unit 40. When the controller 80 generates the position change signal, the position of the head unit 40 may be changed along the first gantry 31 and the second gantry 32.

As shown in FIG. 7, the first substrate S1 may reenter the region below the head unit 40 whose position is changed. The first substrate S1 may move along the first direction X at a constant speed by the transfer unit 70. In this case, the position of the head unit 40 may be fixed. When the first substrate S1 enters the region below the head unit 40 by the transfer unit 70, the controller 80 may generate the droplet discharge signal so that the head unit 40 may discharge the ink droplet to the first substrate S1. The droplet discharge signal may be transmitted to the discharge member 43 of the head unit 40. When the discharge member 43 receives the droplet discharge signal, the head unit 40 may discharge the ink droplet to a top surface of the first substrate S1. In addition, the droplet discharge signal may be repeated transmitted a plurality of times within a same time interval to the discharge member 43.

Figure 8:
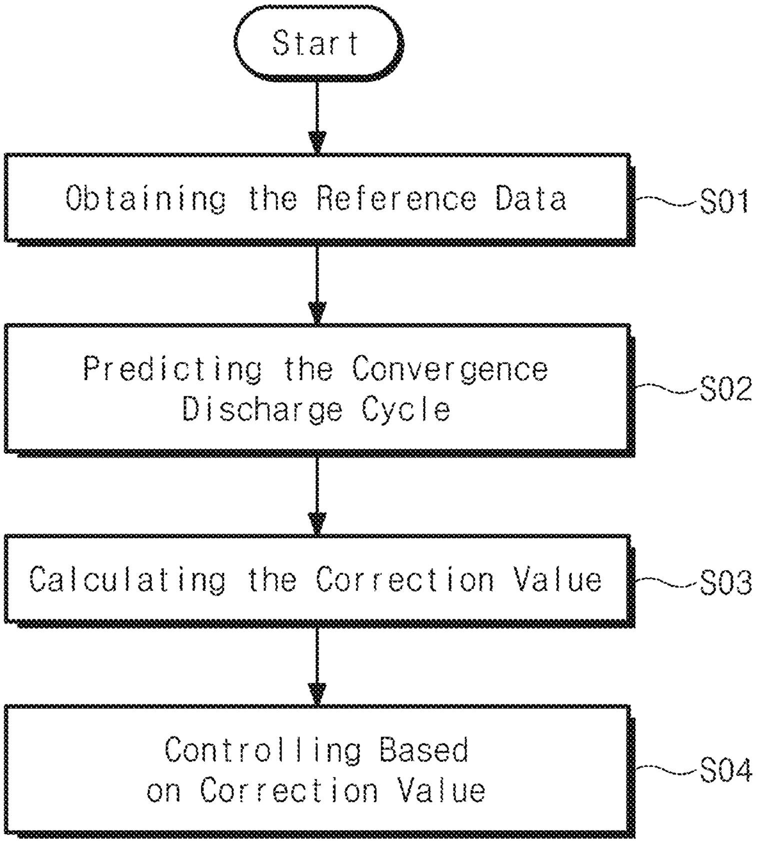
FIG. 8 illustrates a substrate treating control method according to an embodiment of the inventive concept.

Hereinafter, a substrate treating control method according to an embodiment of the inventive concept will be described in detail. FIG. 8 illustrates the substrate treating control method according to an embodiment of the inventive concept. Referring to FIG. 8, the substrate treating control method according to an embodiment of the inventive concept may include a step of obtaining a reference data S01, a step of predicting a convergence discharge cycle S02, a step of calculating a correction value S03, and a step of controlling the head unit 40 based on the correction value S04.

Figure 9:
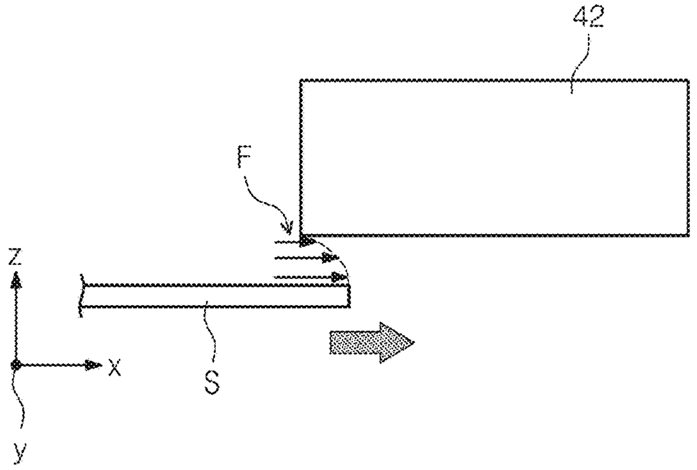
FIG. 9 and FIG. 10 illustrate a state in which a transverse airflow is generated between the head and the substrate.
Figure 10:
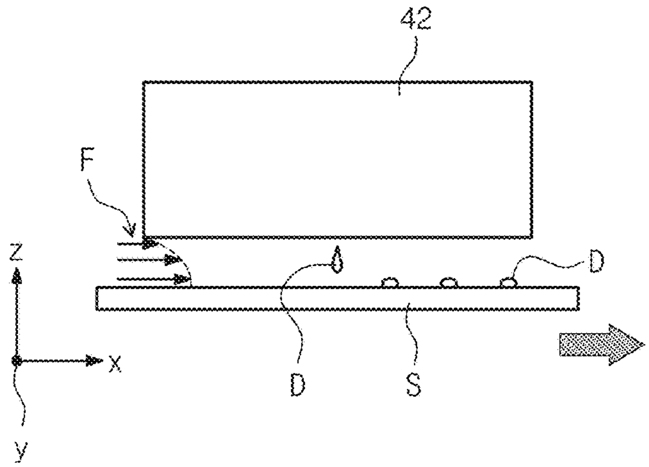

The reference data acquired in the step S01 of obtaining the reference data may be a data used as a basis for predicting the convergence discharge cycle in the step of predicting the convergence discharge cycle S02. As shown in FIG. 9 and FIG. 10, when the substrate S moving at a constant speed enters a region below the head 42, a transverse airflow is generated between the top surface of the substrate S and a bottom surface of the head 42. This transverse airflow affects a falling motion of an ink droplet D discharged from the nozzle **42*b* formed at the head 42**. For example, the transverse airflow affects the impact position of the ink droplet D. The reference data may include an information on a falling position variance G of the falling position of the ink droplet D.

Figure 11:
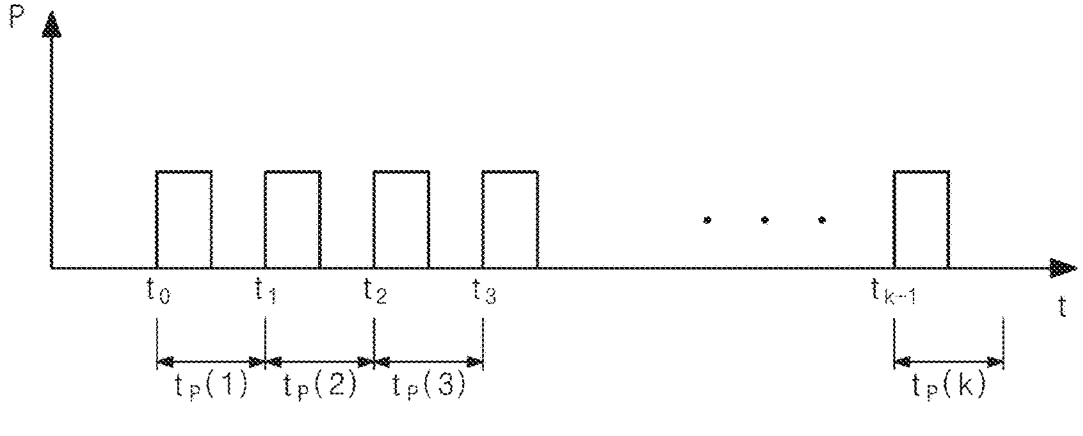
FIG. 11 is a graph illustrating a droplet discharge signal applied to the discharge member of the head unit in a step of obtaining a reference data of FIG. 8.

In the step of obtaining the reference data S01, the substrate S may move a speed and constantly move in a direction. The step of obtaining the reference data S01 may be performed using the second substrate S2, which is a dummy substrate. Alternatively, the step of obtaining the reference data S01 may be performed through a simulation. And, as illustrated in FIG. 11, the controller 80 may generate the droplet discharge signal at a time point ($t_{k-1}$) within a period ($t_p$(k) having a same time interval. Accordingly, the head unit 40 may discharge the ink droplet at a same time interval a plurality of times to the substrate S moving at a speed.

Figure 12:
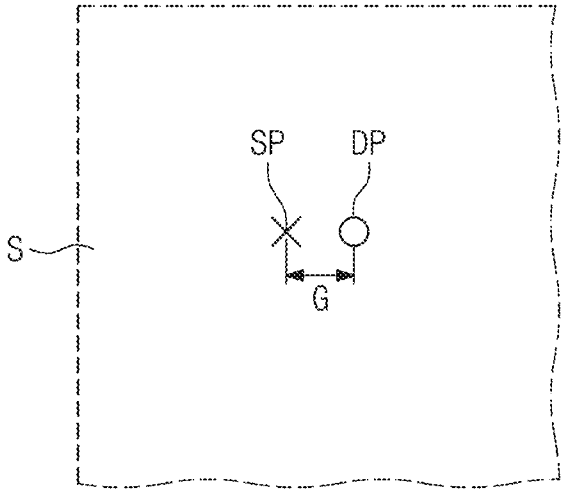
FIG. 12 illustrates a state in which, in the step of obtaining the reference data of FIG. 8, an interval between a nozzle position at a discharge time point of the droplet when viewed from above, and an impact position of the droplet discharged onto the substrate is measured.

FIG. 12 illustrates a state in which, in the step of obtaining the reference data of FIG. 8, an interval between a nozzle position at a discharge time of the droplet viewed from above and an impact position of the droplet discharged on a substrate is measured. When viewed from above, when the head unit 40 discharges the ink droplet D, a position of the nozzle **42*b*** discharging the ink droplet D (SP, hereinafter, referred to as "discharge position") and an actual impact position on the substrate S (DP, hereinafter, referred to as "impact position") does not match and a constant interval is generated (G, hereinafter referred to as "falling position variance"). This is because the substrate S moves at a constant speed, and the transverse airflow described above affects a falling motion of the ink droplet D.

Figure 13:
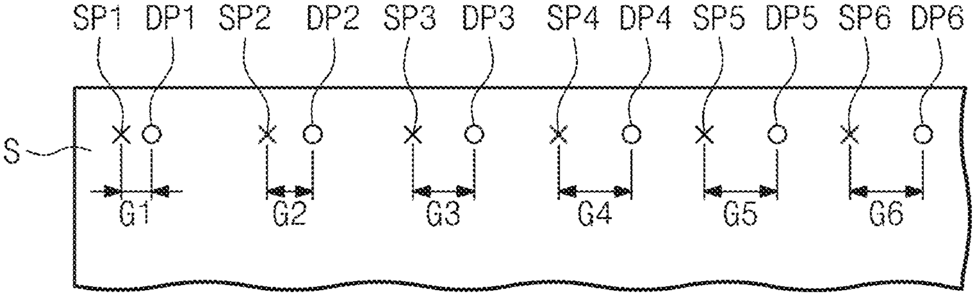
FIG. 13 illustrates a state in which, in the step of obtaining the reference data of FIG. 8, when a discharge of the droplet onto the substrate has been performed in a plurality at a same time interval, the interval between the nozzle position at the discharge time point of the droplet when viewed from above, and the impact position of the droplet discharged onto the substrate is measured.

FIG. 13 illustrates a state of measuring an interval between a nozzle position at a time point when the droplet is discharged when seen from above and an impact position of the droplet discharged on the substrate, when a discharge of the droplet on the substrate is performed in a plurality at a same time interval in the step of obtaining the reference data of FIG. 8. Referring to FIG. 13, in FIG. 13, the discharge positions SP1, SP2, SP3 . . . and the like according to a discharge cycle of the ink droplet D, the impact points DP1, DP2, DP3 . . . and the falling position variance G1, G2, G3 . . . shows a change.

Table 1 below is an example of a test measuring the falling position variance G between the discharge position SP and the impact position DP at each discharge cycle under a condition.

TABLE 1

| Discharge Cycle | Falling Position Variance (G) (μm) |
|---|---|
| 1 | 7.5 |
| 2 | 9 |
| 3 | 10 |
| 4 | 11 |
| 5 | 11 |

Table 2 below is an example of a test measuring the falling position variance G between the discharge position SP and the impact position DP at each discharge cycle under a different condition.

TABLE 2

| Discharge Cycle | Falling Position Variance (G) (μm) |
|---|---|
| 1 | 3 |
| 2 | 3.75 |
| 3 | 4.25 |
| 4 | 4.5 |
| 5 | 4.5 |

As can be seen from Table 1 and Table 2, the falling position variance G varies. This is because the falling position variance G is affected not only by a movement of the substrate S but also by a falling motion of the ink droplet D. In addition, it can be seen that the falling position variance G becomes constant when a certain discharge cycle (the fourth cycle in Table 1 and Table 2) is reached. Hereinafter, the discharge cycle in which the falling position variance G becomes constant is referred to as the convergent discharge cycle. In addition, hereinafter, the discharge cycle performed before the convergent discharge cycle is referred to as the initial discharge cycle. The falling position variance G gradually increases from the initial discharge cycle to the convergent discharge cycle, and after the convergent discharge cycle, the falling position variance G becomes constant. This is because, after the convergence discharge cycle, a speed of the transverse airflow has stabilized, in which the transverse airflow formed between the substrate S and the head 42 flows at a constant speed. The reference data obtained in the step of obtaining the reference data acquired S01 may include an information the falling position variance according to the experience conditions. An information may be included at a falling position variance according to at least one of following experimental conditions: a transfer speed of the substrate S, a falling distance of the ink droplet D (a distance between the bottom surface of the head 42 and the top surface of the substrate S), a falling speed of the ink droplet D (a pressure applied by the discharge member 43), a weight of the ink droplet D (a weight of the ink droplet D per unit volume, and per a type of ink), and an amount of the ink droplet D (a volume of the ink droplet D, and a volume discharged per discharge). The step of obtaining the reference data S01 may be performed at least once, preferably at least twice, by varying the above-described experimental conditions.

In the step of predicting the convergence discharge cycle S02, the convergence discharge cycle in which the above-described falling position variance G becomes constant may be predicted. A prediction of the convergence discharge cycle may be based on the at least one reference data above-described and the treating condition set to treat the substrate S input to the condition reception unit 82.

The convergence discharge cycle is related to a time at which the transverse airflow between the substrate S and the head 42 is stabilized. For example, the prediction unit 83 may predict that a time taken to reach the convergence discharge cycle increases as a time for stabilizing the transverse airflow increases, and that a time taken to reach the convergence discharge cycle decreases as a time taken to stabilize the transverse airflow decreases. For example, when a transfer speed of the substrate S set as the treating condition is high, a stabilization of the transverse flow between the substrate S and the head 42 may be quickly reached. Accordingly, the prediction unit 83 may predict that a time taken to reach the convergence discharge cycle may decrease as the transfer speed of the substrate S set as the treating condition increases. In addition, as the falling distance of the droplet set as the treating condition increases, the volume of the airflow between the substrate S and the head 42 increases. That is, since the amount of airflow between the substrate S and the head 42 increases, a stabilization of the transverse air flow may take a longer time. Accordingly, the prediction unit 83 may predict that a time taken to reach the convergence discharge cycle may increase as the falling distance of the ink droplet D set as the treating condition increases. In addition, the prediction unit 83 may predict that a time taken to reach the convergence discharge cycle decreases as the discharge time interval of the ink droplet D increases.

In addition, if the ink droplet D has a very small volume (e.g., a volume of 6.7 pl or less), the falling speed of the ink droplet D and the weight of the ink droplet D do not significantly affect a fluctuation of the transverse airflow, so these treatment conditions can be ignored in the prediction of convergent discharge cycles.

Figure 14:
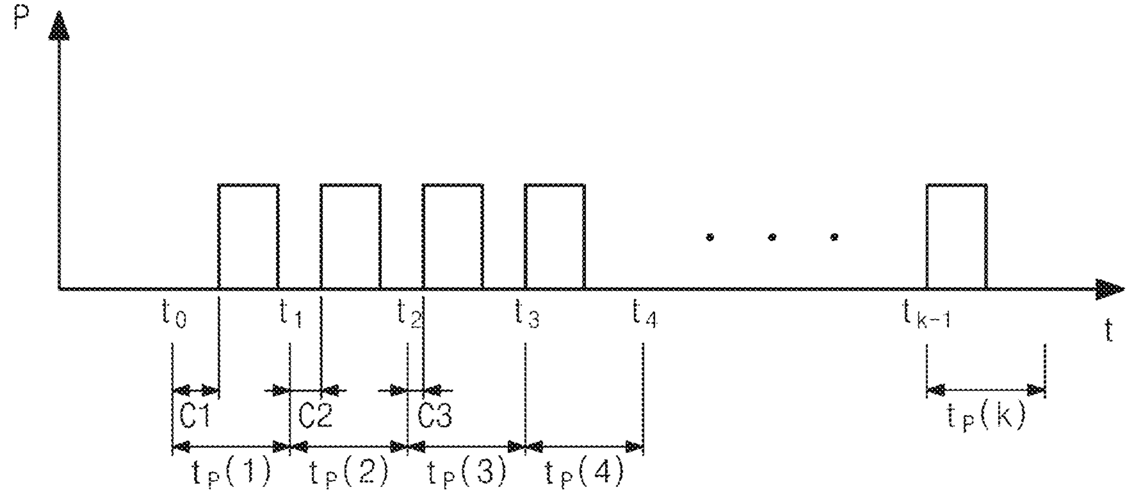
FIG. 14 is a graph illustrating a state in which a droplet discharge timing is corrected at an initial discharge cycle.

In the step of calculating a correction value S03, a correction value for correcting the droplet discharge timing of the initial discharge cycle performed before the convergence discharge cycle may be calculated. This is because falling position variance G of the ink droplet D is constant after the convergence discharge cycle. For example, in the step of calculating the correction value S03, as shown in FIG. 14, the correction unit 84 may calculate the correction value for delaying the droplet discharge timing at the initial discharge cycle (for example, cycle 1 to cycle 3) performed before the convergence discharge cycle (for example, cycle 4). When the droplet discharge timing is delayed at the initial discharge cycle, the substrate S is further moved in accordance with that time. Accordingly, a uniformity of an interval between the ink droplets D discharged after the convergence discharge cycle and the ink droplets D discharged at the initial discharge rotation can be improved.

In addition, if an initial discharge cycle exists in a plurality, the correction unit 84 may calculate a correction value that causes the droplet discharge timing to be delayed as the initial discharge cycle is farther from the convergence discharge cycle. For example, it is possible to calculate a correction value for delaying the droplet discharge timing by the first time C1 in a first cycle, delaying the droplet discharge timing by the second time C2 in a second cycle, and delaying the droplet discharge timing by the third time C3 in a third cycle. The first time C1 may be longer than the second time C2, and the second time C2 may be longer than the third time C3.

In addition, the falling position variance G is affected by a time when the ink droplet D is affected by the transverse airflow and a speed of the transverse airflow. As the time when the ink droplet D is affected by the transverse airflow increases and the speed of the transverse airflow increases, the falling position variance G increases.

Accordingly, when the falling speed of the ink droplet D set as the treating condition is high, the time when the ink droplet D is affected by the transverse airflow is short, therefore the correction value for delaying the droplet discharge timing applied at the initial discharge cycle may be calculated low by the correction unit 84. Similarly, when the weight of the ink droplet D set as the treating condition is large, the correction unit 84 may calculate a small correction value for delaying the droplet discharge timing applied in the initial discharge step since the dropping speed of the ink droplet D is increased.

In addition, when the transfer speed of the substrate S set as the treating condition is large, the speed of the transverse airflow increases, and thus the correction value for delaying the droplet discharge timing applied at the initial discharge step may be calculated highly by the correction unit 84. The correction unit 84 may calculate a large correction value for delaying the droplet discharge timing applied in the initial discharge step when the falling distance of the ink droplet D set as the treating condition increases, and the time for receiving the transverse air flow increases.

In the step of controlling the head unit 40 based on the correction value S04, the droplet discharge timing at the initial discharge cycle of the head unit 40 may be delayed based on the correction value calculated in step S03.

Generally, in order to manage the impact position DP of the ink droplet D, a calibration is performed on the head unit 40. Generally, the calibration focuses on controlling a mechanical precision of the head unit 40, a temperature of the ink, and the like. Recently, as a manufacturing of a liquid crystal display device with a high resolution is being required, a volume of the ink droplet D discharged to the substrate S such as a glass is also becoming very small. For example, the volume of ink droplets D discharged onto the substrate S is reduced to 6.7 pl or less. As the volume of the ink droplet D becomes very small, an effect of the transverse air formed between the substrate S and the head 42 on the falling motion of the ink droplet D further increases.

According to an embodiment of the inventive concept, the droplet discharge timing of the head unit 40 is corrected based on a falling motion change in the ink droplet D according to the volume of the ink droplet D becoming very small. The inventive concept predicts the convergence discharge cycle, which is the droplet discharge cycle after a time when the transverse airflow between the substrate S and the head 42 is stabilized, from the reference data, and performs a correction for delaying the droplet discharge timing for the initial discharge cycle before a predicted convergence discharge cycle. In addition, a magnitude of the correction value delaying the droplet discharge timing is calculated based on a falling speed of the ink droplet D, a falling distance of the ink droplet D, a weight of the ink droplet D, and a transfer speed of the substrate S. That is, according to an embodiment of the inventive concept, the ink droplet D may appropriately impact a desired position, and a uniformity of spacing between the ink droplets D discharged onto the substrate S may be improved. Also, the above-described embodiments can be applied when a distance between the head 42 and the substrate S is within a critical range, and the head 42 discharges the ink droplet D. An upper limit of a threshold interval may be an interval in which the transverse airflow affecting the falling motion of the ink droplet D is generated between the bottom surface of the head 42 and the top surface of the substrate S when the substrate S moves to a region below the head 42. A lower limit of the threshold interval may be an interval in which the transverse airflow is generated when the substrate S is moved to the bottom region of the head 42, and the ink droplets D discharged from the substrate S do not contact the bottom surface of the head 42.

In the above-described example, the substrate S is transferred by the transfer unit 70 and the position of the head unit 40 is fixed in the printing process with respect to the substrate S, but the inventive concept is not limited thereto. For example, during the printing process, the position of the substrate S may be fixed, and the position of the head unit 40 may be changed. That is, a movement of the substrate S should be understood as a concept in which a relative position between the substrate S and the head unit 40 change.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating control method, performed by a substrate treating apparatus, the substrate treating control method comprising:

configuring the substrate treating apparatus that includes a printing device, a maintenance device, a first gantry, a second gantry, and a head, the printing device configured to perform printing on a target substrate, the maintenance device configured to check a state of the head and perform cleaning on the head, the printing device and the maintenance device extending in a first horizontal direction and arranged side by side in a second horizontal direction perpendicular to the first horizontal direction, the first gantry and the second gantry extending over both the printing device and the maintenance device in the second horizontal direction and spaced spart from each other in the first horizontal direction, the head movably coupled to the first gantry and the second gantry and configured to move along the second horizontal direction, discharging, by a nozzle included in the head, a droplet to a dummy substrate placed on the maintenance device in each of a plurality of discharge cycles while changing a relative position of the substrate to the head in a horizontal direction at regular time intervals and at a speed, obtaining reference data, in each of the plurality of discharge cycles, based on a difference between a discharge position of the nozzle at a discharge time of the droplet in each of the plurality of discharge cycles when viewed from above and an impact position on the substrate of the droplet;

predicting a number of one or more initial discharge cycles before reaching a convergence discharge cycle based on the reference data; and applying a correction value to correct a droplet discharge timing of the nozzle during each of the one or more initial discharge cycles, wherein the one or more initial discharge cycles is one or more of the discharge cycles before the convergence discharge cycle, and the convergence discharge cycle is a discharge cycle immediately after a last one of the one or more initial discharge cycles, from among the plurality of discharge cycles, and after the convergence discharge cycle, a falling position variance between the discharge position and the impact position becomes constant.

2. The substrate treating control method of claim 1, wherein:

the predicting includes predicting the number of one or more initial discharge cycles before reaching the convergence discharge cycle, based on reference data previously collected and a treating condition set to treat the substrate.

3. The substrate treating control method of claim 2, wherein the reference data includes information on the falling position variance collected at each of the discharge cycles of the droplet.

4. The substrate treating control method of claim 2, wherein the reference data includes information of the falling position variance according to at least one experimental condition, the at least one experimental condition including at least one of a transfer speed of the substrate, a falling distance of the droplet in each of the plurality of discharge cycles, a falling speed of the droplet in each of the plurality of discharge cycles, an amount of the droplet in each of the plurality of discharge cycles, or a weight of the droplet in each of the plurality of discharge cycles.

5. The substrate treating control method of claim 2, wherein the correction value is a value delaying the droplet discharge timing of each of the one or more initial discharge cycles.

6. The substrate treating control method of claim 5, wherein among the one or more initial discharge cycles, a first initial discharge cycle that is farther from the convergence discharge cycle has a greater correction value than a second initial discharge cycle that is closer to the convergence discharge cycle.

7. The substrate treating control method of claim 5, wherein the greater a falling speed of the droplet, which is set as the treating condition, is, the smaller the correction value is.

8. The substrate treating control method of claim 5, wherein the greater a weight of the droplet, which is set as the treating condition, is, the smaller the correction values is.

9. The substrate treating control method of claim 5, wherein the greater an amount of the droplet, which is set as the treating condition, is, the smaller the correction value is.

10. The substrate treating control method of claim 5, wherein the greater a transfer speed of the substrate, which is set as the treating condition, is, the smaller the correction value is.

11. The substrate treating control method of claim 5, wherein the greater a falling distance of the droplet, which is set as the treating condition, is, the greater the correction value is.

* * * * *